United States Patent
Sayyed et al.

(10) Patent No.: US 11,797,682 B2
(45) Date of Patent: Oct. 24, 2023

(54) PRE-OS RESILIENCY

(71) Applicant: Dell Products L.P., Round Rock, TX (US)

(72) Inventors: Ibrahim Sayyed, Georgetown, TX (US); Daniel L. Hamlin, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/375,809

(22) Filed: Jul. 14, 2021

(65) Prior Publication Data

US 2023/0019196 A1  Jan. 19, 2023

(51) Int. Cl.
*G06F 21/57* (2013.01)

(52) U.S. Cl.
CPC ...... *G06F 21/575* (2013.01); *G06F 2221/033* (2013.01)

(58) Field of Classification Search
CPC .................. G06F 21/575; G06F 2221/033
See application file for complete search history.

(56) References Cited

U.S. PATENT DOCUMENTS

| | | | |
|---|---|---|---|
| 2004/0153724 A1* | 8/2004 | Nicholson | G06F 11/0709 714/E11.133 |
| 2008/0005797 A1* | 1/2008 | Field | G06F 21/575 726/24 |
| 2018/0232521 A1* | 8/2018 | Jeansonne | G06F 21/572 |
| 2020/0099536 A1* | 3/2020 | Block | H04L 9/3236 |

* cited by examiner

*Primary Examiner* — Zahid Choudhury
(74) *Attorney, Agent, or Firm* — Jackson Walker L.L.P.

(57) ABSTRACT

An information handling system may include a physical storage resource having a portion thereof that includes files that are usable during boot of the information handling system; at least one processor; and a Basic Input/Output System (BIOS) including instructions that are executable by the at least one processor for: during a boot process, determining whether any of a plurality of BIOS events have taken place during a previous boot process, wherein the plurality of BIOS events are indicative of malicious behavior during the previous boot process; and in response to a determination that at least a predetermined number of the plurality of BIOS events have taken place during the previous boot process, carrying out a remedial action during the boot process.

18 Claims, 2 Drawing Sheets

PRE-OS RESILIENCY

TECHNICAL FIELD

The present disclosure relates in general to information handling systems, and more particularly to addressing vulnerabilities that occur at the pre-OS level.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Many information handling systems include a Basic Input/Output System (BIOS) such as a Unified Extensible Firmware Interface (UEFI) BIOS. BIOS code may execute prior to the initialization of an operating system (OS) of the information handling system. Further, an EFI system partition (ESP) may be used for hosting OS-specific boot files (e.g., bootx64.efi, and boot configuration data (BCD) such as /EFI/Microsoft/BCD, recovery files such as BIOS_CUR.rcv, BIOS_PRV.rcv, etc.), as well as OEM recovery solution sets (a cloud-based BIOS recovery solution such as BiosConnect, local BIOS recovery images, etc.).

These files located on the ESP partition can be tampered with outside of the context of the OS, leading to pre-OS boot deviations and allowing a malicious user to boot into a UEFI shell. Any malicious code that can execute before the OS is loaded can circumvent multiple security controls, which can result in an attacker gaining control of the system. It is important to track and audit boot-critical files at the pre-OS level to offer resilience when a security compromise is detected. It is desirable to create a tamper detection model and actionable solutions to minimize the attack surface and safeguard the boot-critical and OEM custom images residing at the ESP partition.

It is to be noted that various terms discussed herein (e.g., Secure Boot, etc.) are described in the UEFI Specification version 2.9, which was released in March 2021 (hereinafter, UEFI Specification), which is hereby incorporated by reference in its entirety. One of ordinary skill in the art with the benefit of this disclosure will understand its applicability to other specifications (e.g., prior or successor versions of the UEFI Specification). Further, some embodiments may be applicable to different technologies other than UEFI.

It should be noted that the discussion of a technique in the Background section of this disclosure does not constitute an admission of prior-art status. No such admissions are made herein, unless clearly and unambiguously identified as such.

SUMMARY

In accordance with the teachings of the present disclosure, the disadvantages and problems associated with vulnerabilities that occur at the pre-OS level in information handling systems may be reduced or eliminated.

In accordance with embodiments of the present disclosure, an information handling system may include a physical storage resource having a portion thereof that includes files that are usable during boot of the information handling system; at least one processor; and a Basic Input/Output System (BIOS) including instructions that are executable by the at least one processor for: during a boot process, determining whether any of a plurality of BIOS events have taken place during a previous boot process, wherein the plurality of BIOS events are indicative of malicious behavior during the previous boot process; and in response to a determination that at least a predetermined number of the plurality of BIOS events have taken place during the previous boot process, carrying out a remedial action during the boot process.

In accordance with these and other embodiments of the present disclosure, a method may include during a boot process of an information handling system that includes a physical storage resource having a portion thereof that includes files that are usable during boot of the information handling system, at least one processor, and a Basic Input/Output System (BIOS), the information handling system determining whether any of a plurality of BIOS events have taken place during a previous boot process, wherein the plurality of BIOS events are indicative of malicious behavior during the previous boot process; and in response to a determination that at least a predetermined number of the plurality of BIOS events have taken place during the previous boot process, the information handling system carrying out a remedial action during the boot process.

In accordance with these and other embodiments of the present disclosure, an article of manufacture may include a non-transitory, computer-readable medium having computer-executable code thereon that is executable by a processor of an information handling system that includes a physical storage resource having a portion thereof that includes files that are usable during boot of the information handling system, at least one processor, and a Basic Input/Output System (BIOS), the code being executable for: during a boot process of the information handling system, determining whether any of a plurality of BIOS events have taken place during a previous boot process, wherein the plurality of BIOS events are indicative of malicious behavior during the previous boot process; and in response to a determination that at least a predetermined number of the plurality of BIOS events have taken place during the previous boot process, carrying out a remedial action during the boot process.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
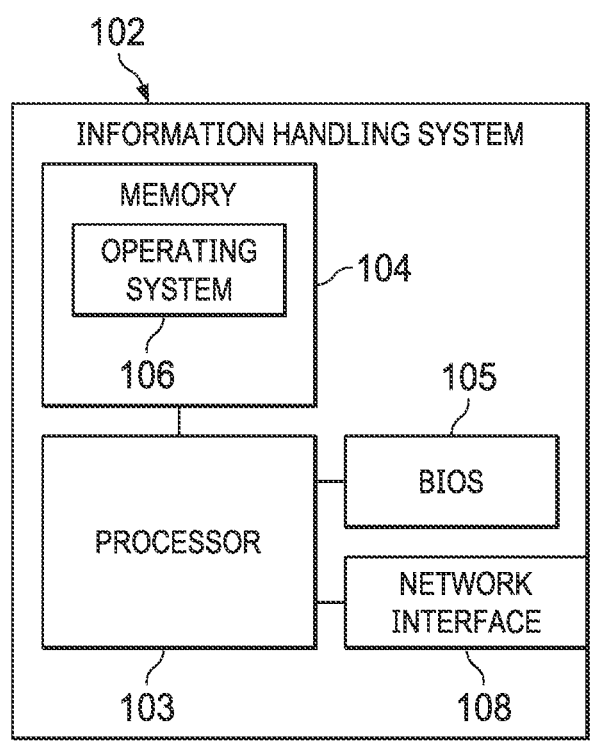
FIG. 1 illustrates a block diagram of an example information handling system, in accordance with embodiments of the present disclosure.
Figure 2:
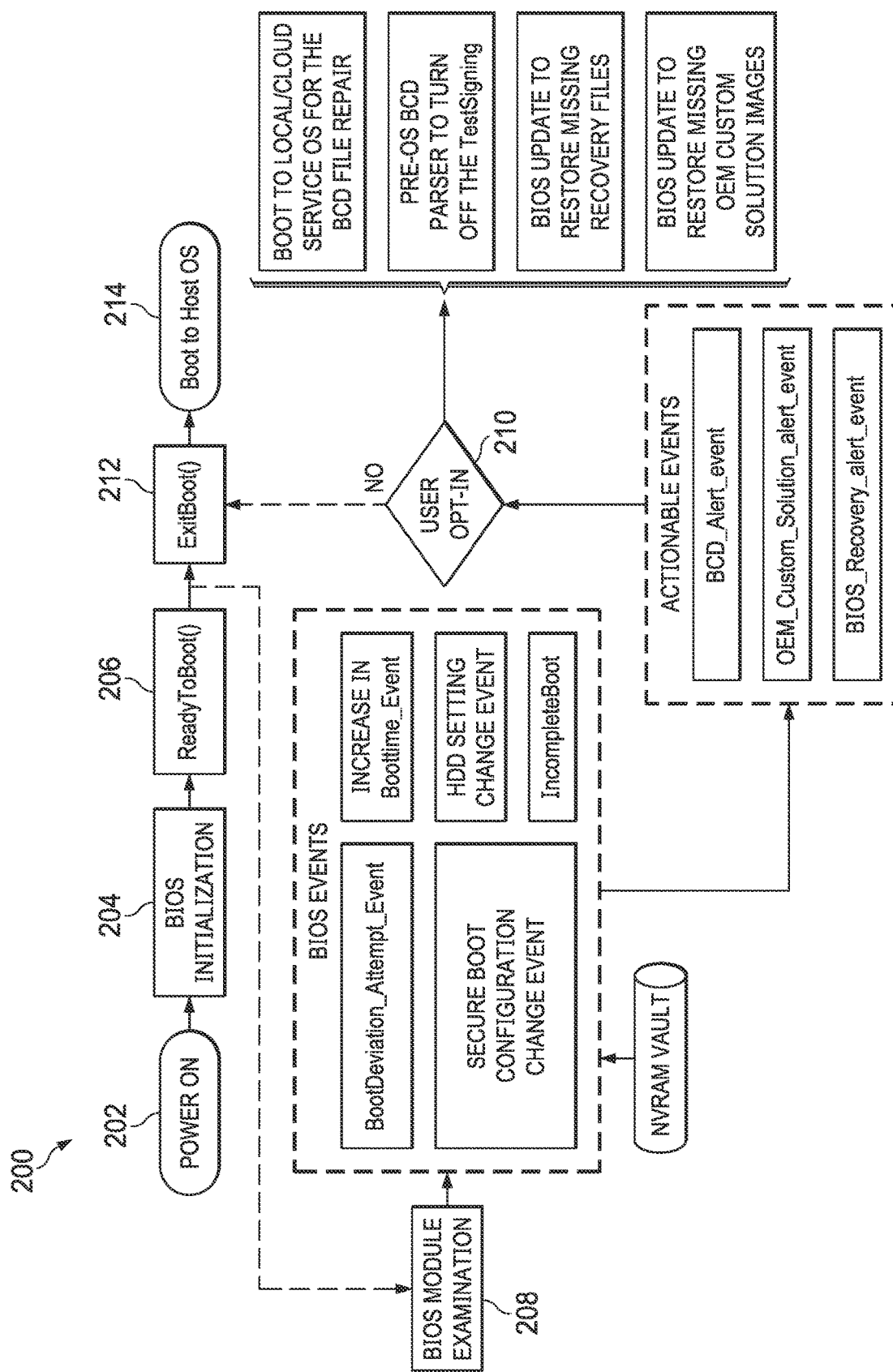
FIG. 2 illustrates an example process flow, in accordance with embodiments of the present disclosure.

Preferred embodiments and their advantages are best understood by reference to FIGS. 1 and 2, wherein like numbers are used to indicate like and corresponding parts.

For the purposes of this disclosure, the term "information handling system" may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU") or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

For purposes of this disclosure, when two or more elements are referred to as "coupled" to one another, such term indicates that such two or more elements are in electronic communication or mechanical communication, as applicable, whether connected directly or indirectly, with or without intervening elements.

When two or more elements are referred to as "coupleable" to one another, such term indicates that they are capable of being coupled together.

For the purposes of this disclosure, the term "computer-readable medium" (e.g., transitory or non-transitory computer-readable medium) may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; communications media such as wires, optical fibers, microwaves, radio waves, and other electromagnetic and/or optical carriers; and/or any combination of the foregoing.

For the purposes of this disclosure, the term "information handling resource" may broadly refer to any component system, device, or apparatus of an information handling system, including without limitation processors, service processors, basic input/output systems, buses, memories, I/O devices and/or interfaces, storage resources, network interfaces, motherboards, and/or any other components and/or elements of an information handling system.

FIG. 1 illustrates a block diagram of an example information handling system 102, in accordance with embodiments of the present disclosure. In some embodiments, information handling system 102 may comprise a server chassis configured to house a plurality of servers or "blades." In other embodiments, information handling system 102 may comprise a personal computer (e.g., a desktop computer, laptop computer, mobile computer, and/or notebook computer). In yet other embodiments, information handling system 102 may comprise a storage enclosure configured to house a plurality of physical disk drives and/or other computer-readable media for storing data (which may generally be referred to as "physical storage resources"). As shown in FIG. 1, information handling system 102 may comprise a processor 103, a memory 104 communicatively coupled to processor 103, a BIOS 105 (e.g., a UEFI BIOS) communicatively coupled to processor 103, a network interface 108 communicatively coupled to processor 103. In addition to the elements explicitly shown and described, information handling system 102 may include one or more other information handling resources.

Processor 103 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in memory 104 and/or another component of information handling system 102.

Memory 104 may be communicatively coupled to processor 103 and may include any system, device, or apparatus configured to retain program instructions and/or data for a period of time (e.g., computer-readable media). Memory 104 may include RAM, EEPROM, a PCMCIA card, flash memory, magnetic storage, opto-magnetic storage, or any suitable selection and/or array of volatile and/or non-volatile memory that retains data after power to information handling system 102 is turned off.

As shown in FIG. 1, memory 104 may have stored thereon an operating system 106. Operating system 106 may comprise any program of executable instructions (or aggregation of programs of executable instructions) configured to manage and/or control the allocation and usage of hardware resources such as memory, processor time, disk space, and input and output devices, and provide an interface between such hardware resources and application programs hosted by operating system 106. In addition, operating system 106 may include all or a portion of a network stack for network communication via a network interface (e.g., network interface 108 for communication over a data network). Although operating system 106 is shown in FIG. 1 as stored in memory 104, in some embodiments operating system 106 may be stored in storage media accessible to processor 103, and active portions of operating system 106 may be transferred from such storage media to memory 104 for execution by processor 103.

Network interface 108 may comprise one or more suitable systems, apparatuses, or devices operable to serve as an interface between information handling system 102 and one or more other information handling systems via an in-band network. Network interface 108 may enable information handling system 102 to communicate using any suitable transmission protocol and/or standard. In these and other embodiments, network interface 108 may comprise a network interface card, or "NIC." In these and other embodiments, network interface 108 may be enabled as a local area network (LAN)-on-motherboard (LOM) card.

As discussed above, vulnerabilities affecting the pre-boot operations of an information handling system can be particularly problematic. Accordingly, embodiments of this disclosure may provide a risk assessment by creating a tamper detection model using BIOS persistent events. An examination of the boot-critical files may then ensure that no compromise has taken place. If any compromise is detected, then remedial action on the boot-critical files may be undertaken on such boot-critical files, UEFI extended solution sets, BIOS recovery files, the host OS and/or recovery OS bootloaders on the ESP partition, etc. In some embodiments, the files may be intelligently restored and/or repaired while the system is booting or performing any system operations such as diagnostics or BIOS updates.

The BIOS may also make use of BIOS events in persistent memory to verify if there has been any boot deviation relative to previous boot session(s). The BIOS can read the BCD file (e.g., immediately prior to boot or while performing diagnostics or other pre-OS tasks to verify whether signing is enabled on the BCD file. The BIOS can make use of BIOS telemetry to verify whether any BIOS setup configuration changes occurred (e.g., disabling Secure Boot to skip verification of the signature of the bootable file(s), etc.).

BCD corruption problems can be challenging for a user. Correcting such problems may require the presence of a host OS recovery image on the hard drive, and/or the user's ability and resources to run recovery tools. Such files may all typically reside on the ESP partition which is "off-SPI" in that it is not part of the memory chip that contains the BIOS.

The BCD file itself is a host OS boot configuration data file which can be altered using a command-line tool (regedit.exe, as well as various 3rd party tools) from outside the host OS context. The BCD file resides in the system ESP partition, which generally is not protected with hard disk encryption features. The ESP partition can be accessed through the BIOS by booting to a command shell. In addition to intentional alteration, the BCD file can also be corrupted by hardware issues such as unexpected shutdown due to power failure, bluescreen or other errors that require a restart, general data corruption, hard drive failure, malicious software, etc.

Other issues with the BCD file can also cause problems. For example, a malicious user may run a command (e.g., "bcdedit/store EFI\Microsoft\boot\BCD/set {default} testsigning ON") in order to enable test signing mode, which allows non-signed drivers to run, which can jeopardize the OS. In some cases, a malicious user may also be able to tamper with UEFI BIOS recovery files as well as payloads associated with UEFI extended solution sets (e.g., BiosConnect payloads).

Turning now to FIG. 2, a flow chart is shown of an example method 200 for providing pre-OS fault resiliency by evaluating the boot-critical files residing at the ESP partition, in accordance with some embodiments of this disclosure.

At steps 202, 204, and 206, the system may be powered on and begin to initialize, eventually reaching the ReadyToBoot( ) stage. At step 208, a BIOS module (which may generally be implemented as code executable in the pre-boot context) may access the critical events that are stored inside the NVRAM memory. These critical events may be events that have occurred during a previous boot process that have been securely logged in the NVRAM memory. Such logging may be carried out by the BIOS module itself or by another component.

Various types of BIOS events may be detected that may be indicative of problems. For example, boot deviation events such as booting from USB, optional ROM boot attempts, etc. may indicate that an attacker is attempting to hijack the boot process. Further, an unexpected increase in boot time events (e.g., the time required to reach the Ready to Boot phase and/or the Exit Boot time) may indicate problems. In some embodiments, the stored critical events may be encrypted to prevent tampering.

Other events may also be indicative of problems. For example, a configuration change related to Secure Boot (e.g., disabling of Secure Boot) may indicate that a malicious user is involved. An indication of a previous incomplete boot (e.g., a boot flag and/or OS setting), as well as BugCheck or other OS-specific variables may also indicate problems. A configuration change event relating to a hard drive or other physical storage resource may likewise be indicative of problems.

The presence of any particular one of the above-described BIOS events may not necessarily indicate a high likelihood of malicious activity, but the presence of each one may increase such likelihood somewhat. A heuristic may thus be based on how many critical BIOS events (or other events indicative of malicious behavior) are detected. For example, in some embodiments, out of the 5 possible events depicted in FIG. 2, an occurrence of 3 or 4 events may be designated as sufficient evidence of malicious activity that a user should be notified and/or remedial action should be taken.

As one specific example of the type of behavior that may be detected by such heuristics, consider the case of an attacker disabling Secure Boot, booting to a USB drive, and editing the BCD or other ESP files. The presence of multiple logged BIOS events may be used to infer that malicious action has occurred.

When the heuristic so indicates, then the BIOS module may examine the boot-critical files residing at the ESP partition. For example, the BIOS module may perform an integrity check on the BCD file to determine whether or not it is intact. The BIOS module may further examine the BCD file to determine whether test signing has been enabled, as discussed above. If either (or in some embodiments both) of these checks find problems, then the BIOS module may record a BCD_Alert_event to indicate that the BCD file needs attention.

As another example, the BIOS module may verify the integrity of the OEM custom image. If a problem is detected, then the BIOS module may record an OEM_Image_Alert_event to indicate that the OEM image needs attention.

As yet another example, the BIOS module may verify the integrity of the BIOS recovery files. If a problem is detected, then the BIOS module may record a BIOS_Recovery_Alert_event to indicate that the BIOS recovery files need attention.

Thus in this embodiment, the various checks may result in up to three BIOS events: BCD_alert_event, OEM_Custom_alert_event, and BIOS_Recovery_alert_event.

If any of these events are recorded, then the user/administrator may be notified at step 210 and given the option of performing various remediation actions. In other embodiments, a setting may be enabled to allow automated remediation without requiring a user to opt-in.

Various types of remediation actions are possible in particular embodiments. For example, the BIOS may make use of pre-OS networking technologies to download replacements for corrupted images from a cloud server. Optionally it may also boot to a service OS (e.g., a self-contained operating system such as a small Linux distribution) which may be hosted locally or on a cloud server. From the service OS, any additional desired corrective action may be undertaken.

In some embodiments, a pre-OS BCD parser may be invoked to disable the test signing setting if needed.

In some embodiments, a BIOS recovery restore can be carried out (e.g., by reading the current BIOS version, making a query to a cloud server to download the recovery files for previous and/or current versions, etc.), and then installing such recovery files.

In some embodiments, the BCD file can be restored by booting to a recovery OS image.

In some embodiments, an OEM custom solution such as a BiosConnect payload can be downloaded from a remote server, or a local BIOS update may be performed to securely restore the missing extended OEM custom solution sets.

In other embodiments, different types of remediation actions may also be carried out, as one of ordinary skill in the art with the benefit of this disclosure will appreciate.

Once any needed remedial action has been taken, the method may proceed to ExitBoot( ) and then the host OS may be initialized at steps 212 and 214. After step 214, the method may end.

One of ordinary skill in the art with the benefit of this disclosure will understand that the preferred initialization point for the method depicted in FIG. 2 and the order of the steps comprising that method may depend on the implementation chosen. In these and other embodiments, this method may be implemented as hardware, firmware, software, applications, functions, libraries, or other instructions. Further, although FIG. 2 discloses a particular number of steps to be taken with respect to the disclosed method, the method may be executed with greater or fewer steps than depicted. The method may be implemented using any of the various components disclosed herein (such as the components of FIG. 1), and/or any other system operable to implement the method.

Accordingly, embodiments of the present disclosure may provide many advantages. For example, a method is disclosed to evaluate the possibility of attack on any of various boot-critical files using BIOS persistent events and offer resiliency by restoring damaged files and safeguarding the booting process. Further, methods are disclosed to inspect a BCD file to verify that test signing is enabled, as well as methods to evaluate risk by performing an assessment on indicators of likely attacks.

Although various possible advantages with respect to embodiments of this disclosure have been described, one of ordinary skill in the art with the benefit of this disclosure will understand that in any particular embodiment, not all of such advantages may be applicable. In any particular embodiment, some, all, or even none of the listed advantages may apply.

This disclosure encompasses all changes, substitutions, variations, alterations, and modifications to the exemplary embodiments herein that a person having ordinary skill in the art would comprehend. Similarly, where appropriate, the appended claims encompass all changes, substitutions, variations, alterations, and modifications to the exemplary embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

Unless otherwise specifically noted, articles depicted in the drawings are not necessarily drawn to scale. However, in some embodiments, articles depicted in the drawings may be to scale.

Further, reciting in the appended claims that a structure is "configured to" or "operable to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke § 112(f) during prosecution, Applicant will recite claim elements using the "means for [performing a function]" construct.

All examples and conditional language recited herein are intended for pedagogical objects to aid the reader in understanding the invention and the concepts contributed by the inventor to furthering the art, and are construed as being without limitation to such specifically recited examples and conditions. Although embodiments of the present inventions have been described in detail, it should be understood that various changes, substitutions, and alterations could be made hereto without departing from the spirit and scope of the disclosure.

What is claimed is:

1. An information handling system comprising:
    a physical storage resource having a portion thereof that includes files that are usable during boot of the information handling system;
    at least one processor; and
    a Basic Input/Output System (BIOS) including instructions that are executable by the at least one processor for:
    during a boot process and prior to beginning initialization of an operating system (OS), determining whether any of a plurality of BIOS events have taken place during a previous boot process, wherein the plurality of BIOS events are indicative of malicious behavior during the previous boot process, and wherein the plurality of BIOS events includes a Secure Boot configuration change event; and
    in response to a determination that at least a predetermined number of the plurality of BIOS events have taken place during the previous boot process, carrying out a remedial action during the boot process and prior to initialization of the OS.

2. The information handling system of claim 1, wherein the BIOS is a Unified Extensible Firmware Interface (UEFI) BIOS.

3. The information handling system of claim 2, wherein the portion of the physical storage resource is an Extensible Firmware Interface (EFI) System Partition (ESP).

4. The information handling system of claim 1, wherein the plurality of BIOS events further includes at least one event selected from the group consisting of a boot deviation attempt, an increased boot time, a setting change relating to the physical storage resource, and an incomplete boot.

5. The information handling system of claim 1, wherein the instructions are further executable for notifying a user prior to carrying out the remedial action.

6. The information handling system of claim 1, wherein the remedial action includes at least one action selected from the group consisting of booting to a service operating system, parsing at least one of the files that are usable during boot and changing a setting therein, and updating the BIOS to restore a missing recovery file.

7. A method comprising:
   during a boot process and prior to beginning initialization of an operating system (OS) of an information handling system that includes a physical storage resource having a portion thereof that includes files that are usable during boot of the information handling system, at least one processor, and a Basic Input/Output System (BIOS), the information handling system determining whether any of a plurality of BIOS events have taken place during a previous boot process, wherein the plurality of BIOS events are indicative of malicious behavior during the previous boot process, and wherein the plurality of BIOS events includes a Secure Boot configuration change event; and
   in response to a determination that at least a predetermined number of the plurality of BIOS events have taken place during the previous boot process, the information handling system carrying out a remedial action during the boot process and prior to initialization of the OS.

8. The method of claim 7, wherein the BIOS is a Unified Extensible Firmware Interface (UEFI) BIOS.

9. The method of claim 8, wherein the portion of the physical storage resource is an Extensible Firmware Interface (EFI) System Partition (ESP).

10. The method of claim 7, wherein the plurality of BIOS events further includes at least one event selected from the group consisting of a boot deviation attempt, an increased boot time, a setting change relating to the physical storage resource, and an incomplete boot.

11. The method of claim 7, further comprising notifying a user prior to carrying out the remedial action.

12. The method of claim 7, wherein the remedial action includes at least one action selected from the group consisting of booting to a service operating system, parsing at least one of the files that are usable during boot and changing a setting therein, and updating the BIOS to restore a missing recovery file.

13. An article of manufacture comprising a non-transitory, computer-readable medium having computer-executable code thereon that is executable by a processor of an information handling system that includes a physical storage resource having a portion thereof that includes files that are usable during boot of the information handling system, at least one processor, and a Basic Input/Output System (BIOS), the code being executable for:
   during a boot process of the information handling system and prior to beginning initialization of an operating system (OS), determining whether any of a plurality of BIOS events have taken place during a previous boot process, wherein the plurality of BIOS events are indicative of malicious behavior during the previous boot process, and wherein the plurality of BIOS events includes a Secure Boot configuration change event; and
   in response to a determination that at least a predetermined number of the plurality of BIOS events have taken place during the previous boot process, carrying out a remedial action during the boot process and prior to initialization of the OS.

14. The article of claim 13, wherein the BIOS is a Unified Extensible Firmware Interface (UEFI) BIOS.

15. The article of claim 14, wherein the portion of the physical storage resource is an Extensible Firmware Interface (EFI) System Partition (ESP).

16. The article of claim 13, wherein the plurality of BIOS events further includes at least one event selected from the group consisting of a boot deviation attempt, an increased boot time, a setting change relating to the physical storage resource, and an incomplete boot.

17. The article of claim 13, wherein the code is further executable for notifying a user prior to carrying out the remedial action.

18. The article of claim 13, wherein the remedial action includes at least one action selected from the group consisting of booting to a service operating system, parsing at least one of the files that are usable during boot and changing a setting therein, and updating the BIOS to restore a missing recovery file.

* * * * *